(12) United States Patent
Edström

(10) Patent No.: US 6,772,574 B1
(45) Date of Patent: Aug. 10, 2004

(54) BINDING MEANS

(75) Inventor: Tomas Edström, Ankarsvik (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/530,394

(22) PCT Filed: May 20, 1998

(86) PCT No.: PCT/SE98/00941

§ 371 (c)(1),
(2), (4) Date: Apr. 26, 2000

(87) PCT Pub. No.: WO98/58843

PCT Pub. Date: Dec. 30, 1998

(30) Foreign Application Priority Data

Jun. 23, 1997 (SE) .............................................. 9702406

(51) Int. Cl.[7] .............................................. G01B 5/04
(52) U.S. Cl. ........................ 53/399; 53/138.6; 53/64; 100/2; 242/563.2; 33/747
(58) Field of Search .................... 53/64, 589, 210, 53/138.6, 504, 399; 100/2, 4, 26, 1, 10; 242/563.2; 33/747, 748, 749

(56) References Cited

U.S. PATENT DOCUMENTS

| | | | |
|---|---|---|---|
| 1,190,916 A | * 7/1916 | Kurkjian .......................... 33/747 |
| 2,060,233 A | * 11/1936 | Mathey et al. ................. 33/748 |
| 2,232,956 A | * 2/1941 | Mathey ........................... 33/748 |
| 2,711,026 A | * 6/1955 | Nelson et al. ................... 33/749 |
| 3,318,005 A | * 5/1967 | Petersen ......................... 33/748 |
| 3,929,063 A | 12/1975 | Stromberg et al. ............. 100/26 |
| 4,285,131 A | * 8/1981 | Demchak et al. .............. 33/747 |
| 4,520,720 A | * 6/1985 | Urban et al. ................... 100/26 |
| 4,534,817 A | * 8/1985 | O'Sullivan ..................... 156/352 |
| 4,754,593 A | 7/1988 | Ishihara et al. |
| 5,177,446 A | 1/1993 | Boriani et al. ............... 324/671 |
| 5,245,760 A | * 9/1993 | Smart et al. ..................... 33/735 |
| 5,299,407 A | 4/1994 | Schuttler et al. .............. 53/399 |
| 5,333,438 A | * 8/1994 | Gurak et al. ................... 53/399 |
| 5,485,712 A | * 1/1996 | Cherney et al. ............... 53/436 |
| 5,551,218 A | * 9/1996 | Henderson et al. ........... 53/504 |
| 5,560,180 A | * 10/1996 | Rodriguez et al. ............ 53/399 |
| 5,746,120 A | 5/1998 | Jonsson ......................... 100/4 |
| 5,809,873 A | * 9/1998 | Chak et al. .................... 100/4 |
| 6,195,967 B1 | * 3/2001 | Todd et al. .................... 53/562 |

FOREIGN PATENT DOCUMENTS

| | | | | |
|---|---|---|---|---|
| DE | 4116619 A | * 11/1992 | .......... A01D/39/00 |
| GB | 1 388 385 | | 4/1971 | |
| GB | 2153293 A | * 8/1985 | ........... A01F/15/08 |

* cited by examiner

*Primary Examiner*—Scott A. Smith
*Assistant Examiner*—John Paradiso
(74) *Attorney, Agent, or Firm*—Lerner, David, Littenberg, Krumholz & Mentlik, LLP

(57) ABSTRACT

A means for binding wire around an object. The means comprises a feeding unit (2) with a feeding wheel (11) for feeding and stretching the wire (3). The measuring of fed wire length normally takes place in that the feeding wheel (11) rotates through a predetermined number of revolutions. Sliding between the wire (3) and feeding wheel (11), however, implies that the position of the wire cannot be determined accurately. As a solution of this problem a separate measuring means (5) is provided for continuously measuring the fed wire length (3), where the measuring is carried out without the measuring means (5) feeding the wire (3).

16 Claims, 1 Drawing Sheet

BINDING MEANS

This invention relates to a means for binding wire around objects, for example bales of fiber material.

Pulp bales are bound around both individually and in the form of stacked units comprising a certain number of bales, usually six or eight bales. Such a unit load has a weight of between one and two tons. The strength of the wire binding tying together the unit load, therefore, is very important from a safety point of view, because several persons may stand near the load while it is being lifted by its wires. The equipment used for tying the knot in a bound wire loop and the knot itself, therefore, are subject of very comprehensive safety regulations and stringent safety controls.

The binding means comprises a unit for feeding the wire from a wire magazine through an openable wire guide bar around the object.

The feeding unit is used also for stretching the wire. The means comprises further a twining member, which includes a unit for locking the wire end, a unit for tying a wire knot, a cutting unit and a unit for projecting the knot.

The wire guide bar extends around the object to be bound and guides the wire at its feed. The wire is fed through the twining member around the object to be bound. When the free end of the wire arrives for the second time at the twining member, the wire is stopped and retained in the locking unit, whereafter the wire is stretched by reversing the feeding unit. The wire guide bar is thereby opened, and the wire is tightened around the object to be bound. The knot is tied, the wire is cut and projected out of the twining member.

In order to achieve an optimum binding and knot-tying result, the correct length of wire must be fed. The wire normally is fed by means of a feeding wheel, which rotates through a predetermined number of revolutions and is driven, for example, by an electric servomotor. The feeding wheel is used also for stretching the wire.

In the wire magazine, on the path of the wire from the wire magazine to the feeding wheel, and in the wire guide bar, however, the wire can jam, whereby sliding can be caused between the feeding wheel and wire. Problems can also arise by variations in the wire quality, in its thickness and hardness, which result in sliding between the feeding wheel and wire.

The sliding creates problems during the feeding. The positions of the wire then cannot be determined, which may cause breakdowns. When then for avoiding sliding the contact pressure from the counter-pressure rolls is increased, there is risk of wire deformation whereby the feed of the wire through the different units in the binding means is made difficult.

The present invention offers a solution of the aforesaid problems, in that the measuring of the fed wire length takes place in a separate measuring means, which is not affected by sliding in the feeding wheel.

The characterizing features of the invention are apparent from the attached claims.

The invention is described in greater details in the following, with reference to the accompanying drawings illustrating an embodiment thereof.

FIG. 1 shows a binding machine.

FIG. 2 shows the measuring means.

The binding means is of the type shown and described in the patent SE 380 496 and in the patent application SE 9303380-1.

The binding means comprises a stand 1 on which the various units are arranged. A feeding unit 2 is provided to feed binding wire 3 in the form of steel wire from a wire magazine around an object 4 to be bound and thereafter to stretch the wire.

A measuring means 5 is provided for continuously measuring the fed wire length. The measuring is carried out without the measuring means 5 feeding the wire.

The measuring means 5 preferably comprises a runner 6, which abuts the wire 3, and a preferably compressed-air loaded dolly roll 15 to ensure that the wire 3 and runner 6 are in contact with each other.

The runner 6 has a contact surface 16, preferably with substantially straight profile. The measuring result is thereby less depending on the wire quality and varying contact pressure.

The runner 6 is coupled to a rotation meter 7, for example an inductive transmitter or a potentiometer, but preferably a pulse transmitter, which measures how much the runner 6 has rolled and, thereby, how much wire has passed the measuring means 5.

A wire guide bar 8 extends about the object to be bound 4. A twining member 9 comprises a guide bar for guiding the wire through the twining member, a unit for locking the wire end, a unit for tying a wire knot, a unit for cutting the wire, and a unit for projecting the completely tied knot.

The entire binding means preferably is movable so that it can be placed in a transport path for the objects to be bound and upon demand easily be exchanged.

The feeding unit 2 comprises guide wheels 10, about which the wire 3 runs, and a driven feeding wheel 11, to which counter-pressure rolls 12 abut. The feeding wheel 11 preferably is driven by an electric servomotor 13.

At the start of the binding machine the end of the wire 3 is positioned with the help of the values from the measuring means 5 to a pre-determined starting position for a binding sequence.

At the wire feed, the feeding unit 2 is driven by the electric servomotor 13, so that a pre-determined length of wire 3 is fed about the object to be bound 4, and the wire end arrives at the locking unit in the twining member 9. The fed wire length is measured by the measuring means 5. The wire end is retained in the twining member 9.

The wire stretching takes place thereafter by reversing the servomotor 13 of the feeding unit 2 until the wire has been stretched down onto the object to be bound 4, and the speed of the wire is zero. The wire movement is measured, for example, by a pulse transmitter in the servomotor 13, but preferably by the measuring means 5.

The wire guide bar 8 is openable and provided with grooves for the wire 3. During the wire feed, the bar 8 is held in closed position by piston/cylinder units 14, preferably pneumatic ones. At the wire stretching, the wire guide bar 8 is opened by the piston/cylinder units 14.

After the wire stretching, the units of the twining member 9 for twining, cutting and projecting the completed wire knot start to operate.

After the cutting, the wire is drawn back a predetermined length to the starting position for the next binding sequence by the feeding unit 2, which is controlled by values from the measuring means 5. The binding means is now ready for a new binding operation.

The correct length of fed wire is ensured in that the wire 3 free of sliding drives the runner 6 of the measuring unit which via the rotation meter 7 transfers the measuring values for controlling the wire feed. Since the moment of inertia in the runner 6 is small in relation to transferred moment between the wire 3 and runner 6, no sliding occurs between the wire 3 and runner 6. The accuracy and operational safety of the binding means can in this way be increased. If in spite thereof sliding should occur, this would only mean that a little too much wire is fed, which does not negatively affect the operational safety.

The invention, of course, is not restricted to the embodiments shown, but can be varied within the scope of the claims with reference to the descriptive part and drawing.

What is claimed is:

1. A method of binding an object, comprising:
   a) feeding a predetermined amount of wire to the object, the feeding being performed by a feed member;
   b) measuring the amount of the wire as the wire is fed, the measuring being performed in a measuring means separate and downstream from the feed member, so that sliding of the wire in said feed member does not affect measurement of the wire, and said measuring means comprising contacting a runner having a contact surface provided with a substantially straight profile with said wire, and maintaining said runner in contact with said wire using a dolly roll arranged opposing said runner;
   c) stretching the wire and disposing the wire on the object; and
   d) forming a knot in the wire so as to bind the object.

2. The method of claim 1, wherein the step of feeding the wire includes feeding the wire until an end of the wire arrives in a predetermined position.

3. The method of claim 1, wherein the step of feeding comprises turning the feed member in a first direction.

4. The method of claim 3, wherein the step of stretching includes retaining an end of the wire while turning the feed member in a second, reverse direction.

5. The method of claim 4, wherein the step of disposing the wire on the object comprises turning the feed member in the reverse direction until the speed of the wire is zero.

6. The method of claim 5, wherein the step of disposing the wire includes measuring the amount of the wire as the feed member is turned in the reverse direction.

7. The method of claim 1, wherein the wire is fed into a guide bar when the guide bar is in a closed position.

8. The method of claim 7, wherein the step of stretching comprises stretching the wire while the guide bar is in an open position.

9. The method of claim 1, further comprising, after the step of forming a knot, cutting the wire and drawing the wire back to a predetermined position.

10. Apparatus for binding wire around an object, comprising:
    a feed member for feeding said wire, said feed member including a driven feed wheel for feeding and stretching said wire, said feed wheel being arranged upstream of the object to be bound, and
    separate measuring means for continuously measuring the length of said wire fed by said feeding member, said measuring means being located downstream from said feed member whereby said measuring means does not feed said wire, sliding of the wire in said feed member does not affect measurement of the wire, and said measuring means comprising a runner including a contact surface having a substantially straight profile for contacting said wire and a dolly roll for assuring that said runner and said wire remain in contact.

11. The apparatus of claim 10 including a rotation meter coupled to said runner.

12. The apparatus of claim 10, further comprising a guide extending around the object, the feed member being located upstream of the guide.

13. The apparatus of claim 12, wherein the guide comprises a bar having an open position and a closed position.

14. The apparatus of claim 13, wherein the feed member is arranged with the guide so that the bar is in the open position during wire stretching and in the closed position during wire feeding.

15. The apparatus of claim 13, wherein the bar has grooves for said wire.

16. The apparatus of claim 10, wherein the feed wheel is rotatable in a first direction to feed said wire and rotatable in a second direction to stretch said wire.

* * * * *

UNITED STATES PATENT AND TRADEMARK OFFICE
CERTIFICATE OF CORRECTION

PATENT NO. : 6,772,574 B1 Page 1 of 5
APPLICATION NO. : 09/530394
DATED : August 10, 2004
INVENTOR(S) : Tomas Edström It is certified that error appears in the above-identified patent and that said Letters Patent is hereby corrected as shown below:

Please delete title page Drawing, Specification and Claim and insert the title page, Drawing, Specification, and Claims that are attached Signed and Sealed this Tenth Day of October, 2006

JON W. DUDAS
*Director of the United States Patent and Trademark Office*

(12) United States Patent
Edström

(10) Patent No.: US 6,772,574 B1
(45) Date of Patent: Aug. 10, 2004

(54) BINDING MEANS

(75) Inventor: Tomas Edström, Ankarsvik (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/530,394

(22) PCT Filed: May 20, 1998

(86) PCT No.: PCT/SE98/00941
§ 371 (c)(1),
(2), (4) Date: Apr. 26, 2000

(87) PCT Pub. No.: WO98/58843
PCT Pub. Date: Dec. 30, 1998

(30) Foreign Application Priority Data

Jun. 23, 1997 (SE) ................................. 9702406

(51) Int. Cl.$^7$ ................................. G01B 5/04
(52) U.S. Cl. ................ 53/399; 53/138.6; 53/64; 100/2; 242/563.2; 33/747
(58) Field of Search ............... 53/64, 589, 210, 53/138.6, 504, 399; 100/2, 4, 26, 1, 10; 242/563.2; 33/747, 748, 749

(56) References Cited

U.S. PATENT DOCUMENTS

| | | | | |
|---|---|---|---|---|
| 1,190,916 A | * | 7/1916 | Kurkjian | 33/747 |
| 2,060,233 A | * | 11/1936 | Mathey et al. | 33/748 |
| 2,232,956 A | * | 2/1941 | Mathey | 33/748 |
| 2,711,026 A | * | 6/1955 | Nelson et al. | 33/749 |
| 3,318,005 A | * | 5/1967 | Petersen | 33/748 |
| 3,929,063 A | | 12/1975 | Stromberg et al. | 100/26 |
| 4,285,131 A | * | 8/1981 | Demchak et al. | 33/747 |
| 4,520,720 A | * | 6/1985 | Urban et al. | 100/26 |
| 4,534,817 A | * | 8/1985 | O'Sullivan | 156/352 |
| 4,754,593 A | | 7/1988 | Ishihara et al. | |
| 5,177,446 A | | 1/1993 | Boriani et al. | 324/671 |
| 5,245,760 A | * | 9/1993 | Smart et al. | 33/735 |
| 5,299,407 A | | 4/1994 | Schuttler et al. | 53/399 |
| 5,333,438 A | * | 8/1994 | Gurak et al. | 53/399 |
| 5,485,712 A | * | 1/1996 | Cherney et al. | 53/436 |
| 5,551,218 A | * | 9/1996 | Henderson et al. | 53/504 |
| 5,560,180 A | * | 10/1996 | Rodriguez et al. | 53/399 |
| 5,746,120 A | | 5/1998 | Jonsson | 100/4 |
| 5,809,873 A | * | 9/1998 | Chak et al. | 100/4 |
| 6,195,967 B1 | * | 3/2001 | Todd et al. | 53/562 |

FOREIGN PATENT DOCUMENTS

| | | | | |
|---|---|---|---|---|
| DE | 4116619 A | * | 11/1992 | A01D/39/00 |
| GB | 1 388 385 | | 4/1971 | |
| GB | 2153293 A | * | 8/1985 | A01F/15/08 |

* cited by examiner

Primary Examiner—Scott A. Smith
Assistant Examiner—John Paradiso
(74) Attorney, Agent, or Firm—Lerner, David, Littenberg, Krumholz & Mentlik, LLP

(57) ABSTRACT

Apparatus is disclosed for binding wire about bales including a feeder for feeding the wire, the feeder including a feed wheel for feeding and stretching the wire, and a separate measuring device for continuously measuring the length of the wire fed by the feeder whereby the measuring device does not feed the wire.

16 Claims, 1 Drawing Sheet

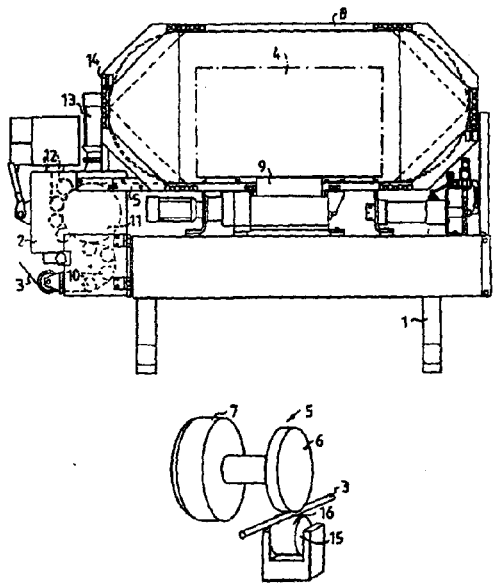

BINDING MEANS

FIELD OF THE INVENTION

The present invention relates to apparatus for binding wire around objects, for example bales of fiber material.

BACKGROUND OF THE INVENTION

Pulp bales are bound around both individual and stacked units comprising a certain number of bales, usually six or eight such bales. Such a unit load has a weight of between one and two tons. The strength of the wire binding together the unit load, therefore, is very important from a safety point of view, because several persons may be standing near the load while it is being lifted by its wires. The equipment used for typing the knot in a bound wire loop and the knot itself, therefore, are subject to very comprehensive safety regulations and stringent safety controls.

The binding means generally comprises a unit for feeding the wire from a wire magazine through an openable wire guide bar around the object.

The feeding unit is also used for stretching the wire. The means used for this purpose comprises a twining member, which includes a unit for locking the wire end, a unit for typing a wire knot, a cutting unit, and a unit for projecting the knot.

The wire guide bar extends around the object to be bound and guides the wire while it is fed. The wire is fed through the twining member around the object to be bound. When the free end of the wire returns to the twining member, the wire is stopped and retained in the locking unit, whereafter the wire is stretched by reversing the feeding unit. The wire guide bar is thereby opened, and the wire is tightened around the object to be bound. The knot is tied, the wire is cut and projected out of the twining member.

In order to achieve optimum binding and knot-typing results, the correct length of wire must be fed. The wire is normally fed by means of a feeding wheel, which rotates through a predetermined number of revolutions and is driven, for example, by an electric servomotor. The feeding wheel is also used for stretching the wire.

In the wire magazine, on the path of the wire from the wire magazine to the feeding wheel, and in the wire guide bar, however, the wire can jam, whereby sliding can be caused between the feeding wheel and wire. Problems can also arise because of variations in the wire quality, and in its thickness and hardness, which also result in sliding between the feeding wheel and wire.

This sliding creates problems during the feeding process. The positions of the wire cannot thus be determined, which may cause breakdowns. When, for avoiding sliding, the contact pressure from the counter-pressure rolls is increased, there is the risk of wire deformation whereby the feed of the wire through the different units in the binding means is made difficult.

SUMMARY OF THE INVENTION

In accordance with the present invention these and other difficulties have now been overcome by the invention of apparatus for binding wire around an object comprising a feed member for feeding the wire, the feed member including a feed wheel for feeding and stretching the wire, and separate measuring means for continuously measuring the length of the wire fed by the feeding member whereby the measuring means does not feed the wire. Preferably, the measuring means comprises a runner including a contact surface for contacting the wire.

In accordance with one embodiment of the apparatus of the present invention, the contact surface has a substantially straight profile.

In accordance with another embodiment of the apparatus of the present invention, the measuring means comprises a dolly roll for assuring that the runner and the wire remain in contact.

In accordance with another embodiment of the present invention, apparatus includes a rotation meter coupled to the runner.

The present invention thus offers a solution to the aforesaid problems, in that measuring of the length of the fed wire takes place in a separate measuring means, which is not affected by sliding in the feeding wheel.

BRIEF DESCRIPTION OF THE DRAWINGS

The present invention may be more fully appreciated with reference to the following detailed description, which, in turn, refers to the drawings in which.

DETAILED DESCRIPTION

Figure 1:
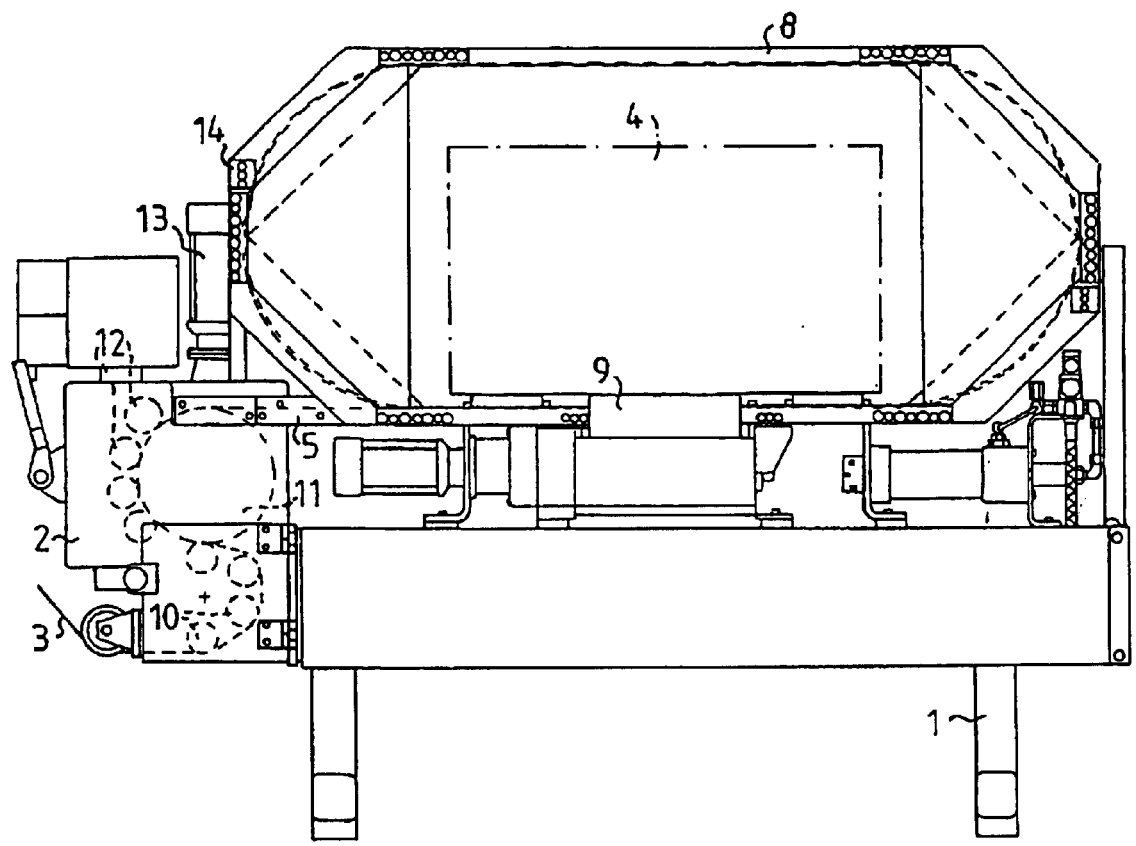
FIG. 1 is a side, elevational view of a binding machine in accordance with the present invention.
Figure 2:
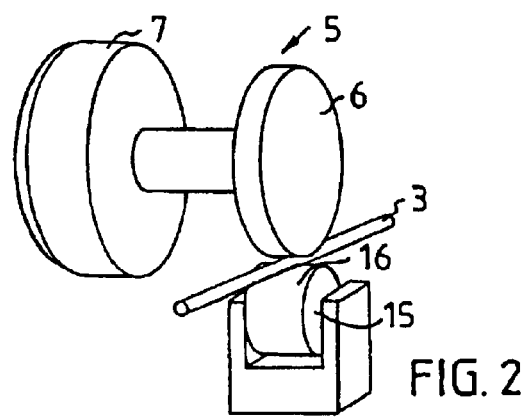
FIG. 2 is an enlarged front, perspective view of the measuring means of the present invention.
Figure 1:
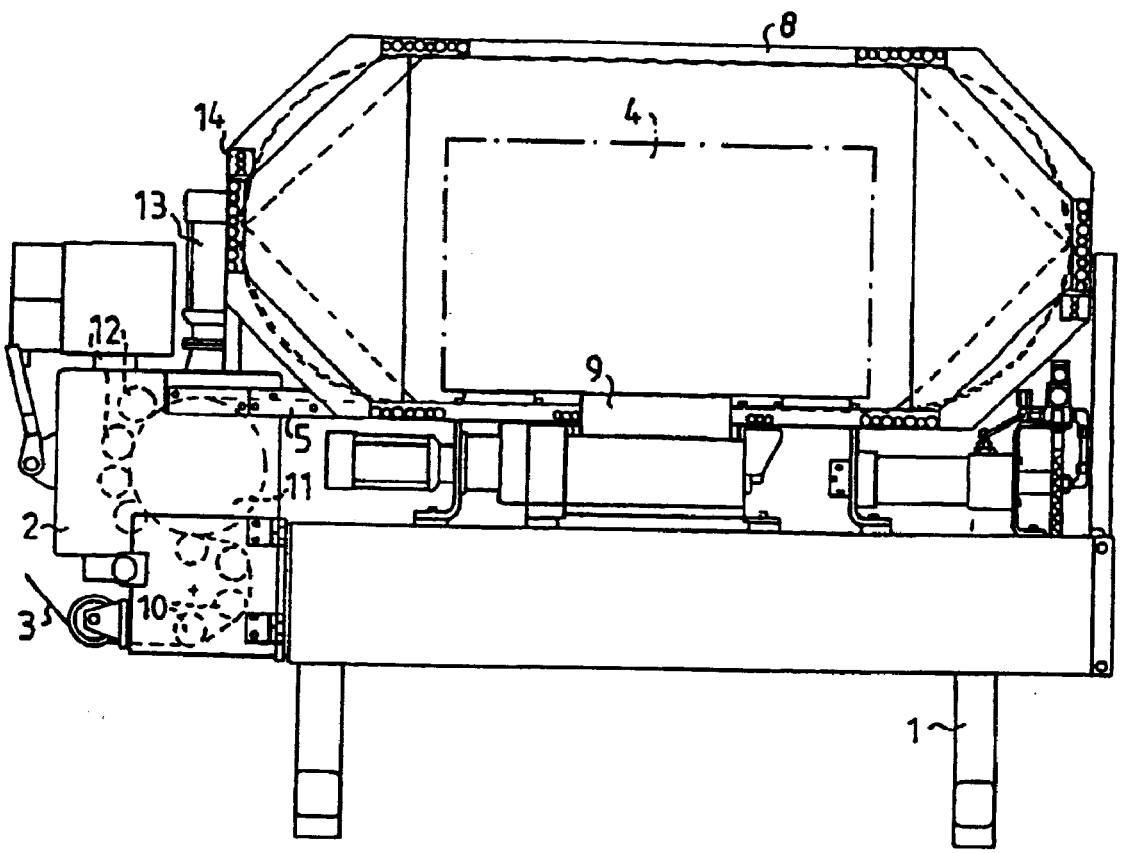
Figure 2:
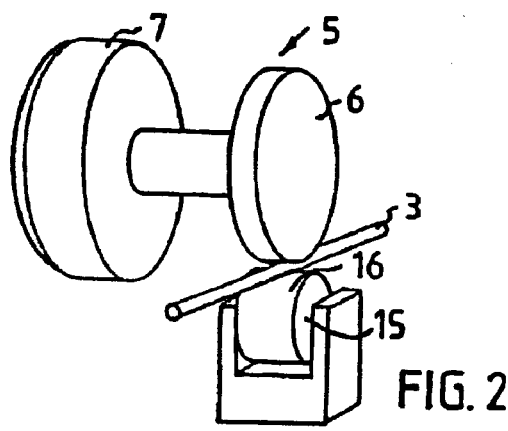

The binding means used in the binding machine of FIG. 1 is of the type shown and described in Swedish Patent No. 380,496, and in Swedish Patent Application No. 93/03380-1.

The binding means thus comprises a stand 1 on which the various units are arranged. A feeding unit 2 is provided to feed binding wire 3 in the form of steel wire from a wire magazine around an object 4 to be bound, and thereafter to stretch the wire.

A measuring means 5 is provided for continuously measuring the length of fed wire. The measuring is carried out without the measuring means 5 feeding the wire.

The measuring means 5 preferably comprises a runner 6, which abuts the wire 3, and preferably a compressed-air loaded dolly roll 15 to ensure that the wire 3 and runner 6 are in contact with each other.

The runner 6 has a contact surface 16, preferably with a substantially straight profile. The measuring result is thereby less dependent on the wire quality and varying contact pressure.

The runner 6 is coupled to a rotation meter 7, for example an inductive transmitter or a potentiometer, but preferably a pulse transmitter, which measures how much the runner 6 has rolled out and, thereby, how much wire has passed the measuring means 5.

A wire guide bar 8 extends about the object to be bound 4. A twining member 9 comprises a guide bar for guiding the wire through the twining member, a unit for locking the wire end, a unit for tying a wire knot, a unit for cutting the wire, and a unit for projecting the completely tied knot.

The entire binding means is preferably movable so that it can be placed in a transport path for the objects to be bound and easily exchanged on demand.

The feeding unit 2 comprises guide wheels 10, about which the wire 3 runs, and a driven feeding wheel 11, to which counter-pressure rolls 12 abut. The feeding wheel 11 is preferably driven by an electric servomotor 13.

At the start of the binding machine the end of the wire 3 is positioned with the help of the values from the measuring means 5 to a predetermined starting position for a binding sequence.

During feeding of the wire, the feeding unit 2 is driven by the electric servomotor 13, so that a predetermined length of wire 3 is fed about the object to be bound 4, and the wire end arrives at the locking unit in the twining member 9. The fed wire length is measured by the measuring means 5. The wire end is retained in the twining member 9.

The wire stretching takes place thereafter by reversing the servomotor 13 of the feeding unit 2 until the wire has been stretched down onto the object to be bound 4, and the speed of the wire is zero. The wire movement is measured, for example, by a pulse transmitter in the servomotor 13, but preferably by the measuring means 5.

The wire guide bar 8 is openable and provided with grooves for the wire 3. During feeding of the wire, the bar 8 is held in closed position by piston/cylinder units 14, which are preferably pneumatic. During the wire stretching, the wire guide bar 8 is opened by the piston/cylinder units 14.

After the wire stretching, the units of the twining member 9 for twining, cutting and projecting the completed wire knot start to operate.

After the cutting, the wire is drawn back a predetermined length to the starting position for the next binding sequence by the feeding unit 2, which is controlled by values from the measuring means 5. The binding means is now ready for a new binding operation.

The correct length of fed wire is ensured in that the wire 3 free of sliding drives the runner 6 of the measuring unit which, by means of the rotation meter 7, transfers the measuring values for controlling the wire feed. Since the moment of inertia in the runner 6 is small in relation to the transferred moment between the wire 3 and runner 6, no sliding occurs between the wire 3 and runner 6. The accuracy and operational safety of the binding means can in this way be increased. If in spite thereof sliding should occur, this would only mean that a little too much wire is fed, which does not negatively affect the operational safety.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of binding an object, comprising:
   a) feeding a predetermined amount of wire to the object, the feeding being performed by a feed member;
   b) measuring the amount of the wire as the wire is fed, the measuring being performed in a measuring means separate and downstream from the feed member, so that sliding of the wire in said feed member does not affect measurement of the wire, and said measuring means comprising contacting a runner having a contact surface provided with a substantially straight profile with said wire, and maintaining said runner in contact with said wire using a dolly roll arranged opposing said runner;
   c) stretching the wire and disposing the wire on the object; and
   d) forming a knot in the wire so as to bind the object.

2. The method of claim 1, wherein the step of feeding the wire includes feeding the wire until an end of the wire arrives in a predetermined position.

3. The method of claim 1, wherein the step of feeding comprises turning the feed member in a first direction.

4. The method of claim 3, wherein the step of stretching includes retaining an end of the wire while turning the feed member in a second, reverse direction.

5. The method of claim 4, wherein the step of disposing the wire on the object comprises turning the feed member in the reverse direction until the speed of the wire is zero.

6. The method of claim 5, wherein the step of disposing the wire includes measuring the amount of the wire as the feed member is turned in the reverse direction.

7. The method of claim 1, wherein the wire is fed into a guide bar when the guide bar is in a closed position.

8. The method of claim 7, wherein the step of stretching comprises stretching the wire while the guide bar is in an open position.

9. The method of claim 1, further comprising, after the step of forming a knot, cutting the wire and drawing the wire back to a predetermined position.

10. Apparatus for binding wire around an object, comprising:
    a feed member for feeding said wire, said feed member including a driven feed wheel for feeding and stretching said wire, said feed wheel being arranged upstream of the object to be bound, and
    separate measuring means for continuously measuring the length of said wire fed by said feeding member, said measuring means being located downstream from said feed member whereby said measuring means does not feed said wire, sliding of the wire in said feed member does not affect measurement of the wire, and said measuring means comprising a runner including a contact surface having a substantially straight profile for contacting said wire and a dolly roll for assuring that said runner and said wire remain in contact.

11. The apparatus of claim 10 including a rotation meter coupled to said runner.

12. The apparatus of claim 10, further comprising a guide extending around the object, the feed member being located upstream of the guide.

13. The apparatus of claim 12, wherein the guide comprises a bar having an open position and a closed position.

14. The apparatus of claim 13, wherein the feed member is arranged with the guide so that the bar is in the open position during wire stretching and in the closed position during wire feeding.

15. The apparatus of claim 13, wherein the bar has grooves for said wire.

16. The apparatus of claim 10, wherein the feed wheel is rotatable in a first direction to feed said wire and rotatable in a second direction to stretch said wire.

* * * * *